(12) United States Patent
Maclean

(10) Patent No.: US 10,046,626 B2
(45) Date of Patent: Aug. 14, 2018

(54) APPARATUS FOR REMOVAL OF MATERIAL FROM A SURFACE

(71) Applicant: ADAGIO INDUSTRIES INC., Fall River (CA)

(72) Inventor: David A. Maclean, Bedford (CA)

(73) Assignee: ADAGIO INDUSTRIES INC., Fall River (CA)

( * ) Notice: Subject to any disclaimer, the term of this patent is extended or adjusted under 35 U.S.C. 154(b) by 125 days.

(21) Appl. No.: 15/080,331

(22) Filed: Mar. 24, 2016

(65) Prior Publication Data

US 2016/0280052 A1    Sep. 29, 2016

(30) Foreign Application Priority Data

Mar. 25, 2015    (CA) ..................................... 2886411

(51) Int. Cl.
*B60J 7/00* (2006.01)

(52) U.S. Cl.
CPC .................................. *B60J 7/0092* (2013.01)

(58) Field of Classification Search
CPC ...................................................... B60J 7/0092
USPC ... 296/136.01, 136.07, 136.1, 136.02, 180.1; 141/10; 150/154; 15/97.3
See application file for complete search history.

(56) References Cited

U.S. PATENT DOCUMENTS

| | | | | |
|---|---|---|---|---|
| 5,350,000 | A | * | 9/1994 | Wang ....................... B60J 11/00 150/166 |
| 5,890,525 | A | * | 4/1999 | Shores ..................... B60J 11/00 150/166 |
| 2008/0184506 | A1 | | 8/2008 | Dix et al. |
| 2010/0043913 | A1 | | 2/2010 | Othman |

FOREIGN PATENT DOCUMENTS

| | | |
|---|---|---|
| CA | 2 360 877 A1 | 4/2003 |
| DE | 197 12 648 A1 | 10/1998 |
| DE | 10 2004 058 65 A1 | 6/2006 |

* cited by examiner

*Primary Examiner* — Joseph D. Pape
(74) *Attorney, Agent, or Firm* — Seed IP Law Group LLP

(57) ABSTRACT

An apparatus for shedding material accumulated on a surface is disclosed. The apparatus is an elastic expandable vessel with fluid inlet and outlet. The elastic expandable vessel is fixed to the surface in a flat shape. Upon the introduction of fluid into the expandable vessel, the expandable vessel expands into a domed shape so that material accumulated on the surface slides off under the influence of gravity. Upon the egress of fluid out of the expandable vessel, the expandable vessel flattens.

17 Claims, 4 Drawing Sheets

APPARATUS FOR REMOVAL OF MATERIAL FROM A SURFACE

TECHNICAL FIELD

The present disclosure relates to an apparatus for removing unwanted material from a surface, including the removal of snow, ice or other debris from the roof of a vehicle, such as a truck trailer.

BACKGROUND

Description of the Related Art

In this disclosure, any reference to a vehicle includes reference to the vehicle and to a vehicle trailer and includes any means of conveyance self-propelled or otherwise, for use on road, rail, or otherwise.

Debris or unwanted material, such as snow, ice, dirt, sand, ash, for example, may accumulate on an upper surface or roof of a vehicle. Accumulation of material may particularly occur when the vehicle is stationary. If the material is not removed prior to operation of the vehicle, then there is a danger that the material may be blown off the vehicle during operation of the vehicle. The blown-off material may create an obstacle or obstruction for other vehicles. The blown-off material may also impact and cause damage to another vehicle. Either situation may result in a traffic accident. Further, debris or other unwanted material, such as snow or ice, present on the vehicle will increase the weight of the vehicle and may decrease aerodynamic performance of the vehicle. Increased weight and decreased aerodynamic performance may both result increased fuel use, cost of travel, and resultant pollution. Thus, it is preferable to remove the unwanted material from the vehicle prior to travel.

Methods exist for clearing snow from the roof of a tractor trailer. Such methods include manual use of a shovel, brush, or scraper to push or carry the snow away. Manual shoveling is laborious and dangerous to the shoveller who may slip or fall from the roof surface, causing possible injury. Furthermore, shoveling snow and ice at such heights, in cold temperatures, is an unpleasant activity for the shoveller.

Material may also be removed by fixed or moving apparatus. Apparatus exists where a vehicle drives through a fixed brush or scraper, pushing material off the surface of the roof, or where a brush or scraper apparatus brushes or scrapes across the roof of a vehicle, pushing material from the roof. Such systems may be of some benefit at locations such as truck stops, but are otherwise impractical because material may accumulate on the roof of a vehicle at a distance away from the brush or scraper apparatus, requiring travel on roads with material, leading to the concerns raised above. Further, such an apparatus needs to be tuned to the height of the particular vehicle, and the presence or buildup of snow or ice under the apparatus, where the tires of the vehicle may travel, may alter the net height of the vehicle, rendering the brush or scraper ineffective or damaging to the vehicle.

Apparatus also exists for the removal of material, such apparatus formed of expandable vessels fixed to the roof surface of a truck trailer. Such expandable vessels may push outwardly on the accumulated material under expansion of the vessel allowing the material to slide off the surface, or may expand to push and incline a planar surface so that the accumulated material sides off the inclined surface under the influence of gravity.

BRIEF SUMMARY

In one embodiment, an apparatus for shedding material accumulated above a surface is disclosed, the apparatus having an expandable vessel made of an elastic material, and having a fluid inlet and a pressure regulating fluid outlet. The expandable vessel is adapted to receive a fluid via the fluid inlet and contain the fluid such that upon fluid being introduced into the expandable vessel, via the fluid inlet, pressure will be exerted on the elastic material such that the expandable vessel expands from the substantially flat shape to a domed shape such that the material accumulated above the surface is shed from the surface under the influence of gravity, the pressure regulating fluid outlet adapted to regulate the pressure the fluid exerts on the elastic material to a maximum pressure In one embodiment, the expandable vessel may be stretched and fixed to the surface under tension such that the expandable vessel lies in a substantially flat shape on the surface. The expandable vessel may be stretched up to 125 percent of its upstretched width. In one embodiment, the elastic expandable vessel is comprised of a synthetic rubber. In one embodiment, the synthetic rubber may be an m-class rubber, such as an ethylene propylene diene monomer.

In one embodiment, the fluid is air from a vehicle brake system.

In one embodiment, the expandable vessel is comprised of sheets of synthetic rubber having edges, wherein the sheets are bonded in the region of the edges so as to enclose the volume.

In one embodiment, under the egress of fluid, the expandable vessel deflates from the dome shape to the substantially flat shape under the tension of the stretched elastic material. In one embodiment, the fluid inlet is adapted to engage air lies of a vehicle.

In another embodiment a vehicle having a roof and an expandable elastic vessel for shedding material accumulated on the roof is disclosed. The expandable vessel is made of an elastic material, stretched and attached to the roof under tension such that the expandable vessel lies in a substantially flat shape on the roof, the expandable vessel adapted to contain a fluid and comprising a fluid port and a pressure regulating fluid outlet wherein upon fluid being introduced into the expandable vessel via the fluid port, under pressure, the expandable vessel expands from the substantially flat shape to a domed shape wherein material accumulated on the roof is shed from the roof under the influence of gravity, and wherein the pressure regulating fluid outlet regulates the pressure of the fluid inside the expandable vessel to a maximum pressure.

In another embodiment, a trailer having a roof and an expandable elastic vessel for shedding material accumulated on the roof is disclosed. The expandable vessel is made of an elastic material, stretched and attached to the roof under tension such that the expandable vessel lies in a substantially flat shape on the roof, the expandable vessel adapted to contain a fluid and comprising a fluid port and a pressure regulating fluid outlet wherein upon fluid being introduced into the expandable vessel via the fluid port, under pressure, the expandable vessel expands from the substantially flat shape to a domed shape wherein material accumulated on the roof is shed from the surface under the influence of gravity, and wherein the pressure regulating fluid outlet regulates the pressure of the fluid inside the expandable vessel to a maximum pressure.

In another embodiment, a flange is adapted to prevent the flow of air between the expandable vessel and the surface.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known materials, structures and methods associated with vehicles have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a", "an", and "the" include plural referents unless the content clearly dictates otherwise. It should also be noted that the term "or" is generally employed in its sense including "and/or" unless the content clearly dictates otherwise.

The headings and Abstract provided herein are for convenience only and do not interpret the scope or meaning of the embodiments.

Figure 1:
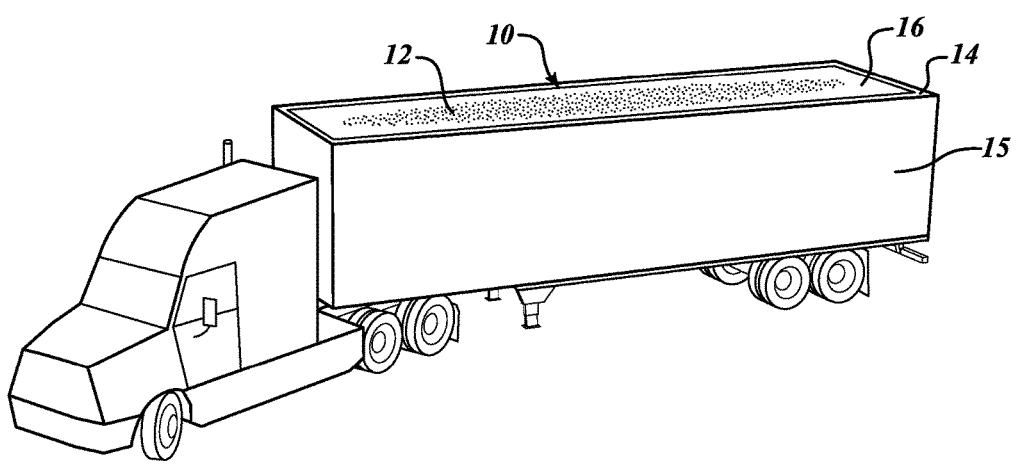
FIG. 1 is a perspective view of apparatus depicted on the roof of a tractor-trailer in an unexpanded state.

FIG. 1 is a perspective view of apparatus 10 for shedding material 12 accumulated above a surface 14. In FIG. 1, surface 14 is shown as the roof a vehicle, a trailer of a tractor-trailer 15. The surface may be the upper surface of a trailer, a vehicle, a box-car, a non-mobile structure, or other conveyance or structure.

In FIG. 1, material 12 accumulated above surface 14 is shown accumulated generally centrally on apparatus 10 so as to not obscure the features of apparatus 10. In operation however, material 12 may cover a different portion or the entirety of surface 14 of the trailer of tractor trailer 15 (or other vehicle, trailer, conveyance, or structure).

Figure 2:
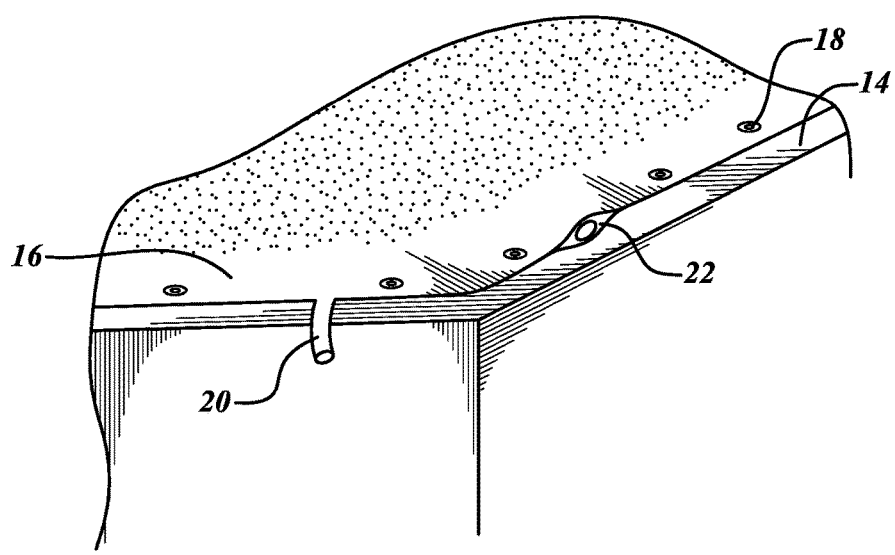
FIG. 2 is a perspective view of a portion of the apparatus depicted on the roof of a tractor-trailer in an unexpanded state.

FIG. 2 is a close-up perspective view of a portion of apparatus 10. Apparatus 10 includes an expandable vessel 16, a fluid inlet 20, a pressure regulating fluid outlet 22, and attachment means 18 to fix apparatus 10 to the surface 14.

Expandable vessel 16 is manufactured at least partially from an elastic material such that the expandable vessel 16, its unexpanded state, lies substantially along the plane of surface 14. Attachment means 18 to fix apparatus 10 to the surface 14 may, as depicted in FIG. 2, include a series of eyelets. Corresponding hooks, which may be part of the vehicle 15, engage eyelets. When fixed to the surface 14, expandable vessel 16 of apparatus 10 is stretched outwardly in the plane of the surface 14 and held in place in tension.

Figure 3:
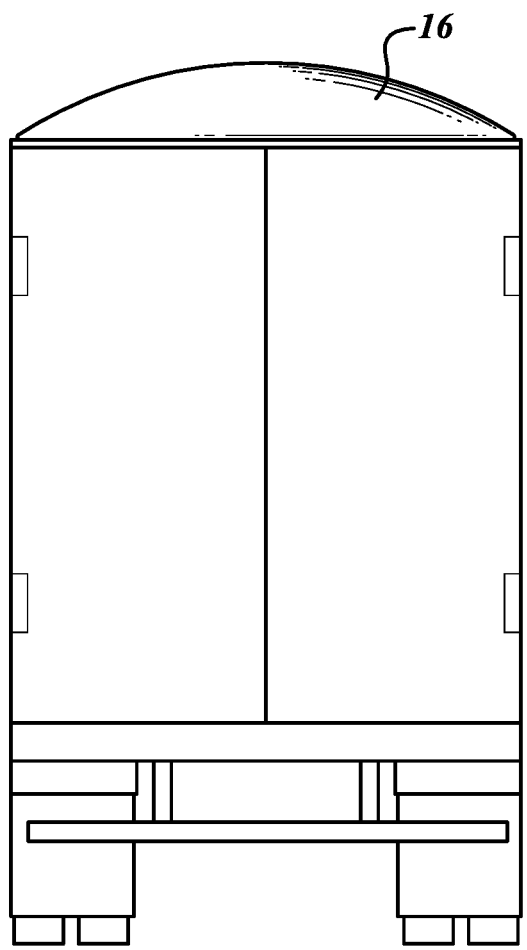
FIG. 3 is a rear view of apparatus depicted on the roof of a tractor-trailer in an expanded state.

Expandable vessel 16 is adapted to receive fluid via a fluid inlet 20, as shown in FIG. 2. Upon the introduction of fluid into expandable vessel 16 via fluid inlet 20, expandable vessel 16 will begin to fill with the fluid. Pressure may be required to introduce fluid into expandable vessel 16. With sufficient fluid pressure, fluid will exert a force on expandable vessel 16. At a point, the fluid pressure will be sufficient to cause expandable vessel 16 to expand or inflate under the pressure of the introduced fluid. Expandable vessel 16 will then shift from having a substantially flat conformation, along the plane of the surface 14 to a domed shape, as shown in FIG. 3. As the expandable vessel 16 continues to become more and more domed, the friction between the material 12 and expandable vessel 16 will be reduced until such point as the force of gravity will overcome the frictional force resulting in material 12 sliding off the domed-shaped expandable vessel 16. The action of expandable vessel 16 expanding to a domed shape may also cause material accumulated and aggregated on surface, such as ice, to break up, and may also cause any adhesion between material 12 and expandable vessel 16, such as ice sticking directly to the expandable vessel 16 itself, to be severed. Fluid inlet may be a valve that allows inflation of expandable vessel 16, and allows for expandable vessel 16 to remain inflated.

As more fluid is introduced into expandable vessel 16 via fluid inlet 20, more pressure will be exerted on expandable vessel 16. Expandable vessel 16 will continue to expand in the manner depicted in FIG. 3. At a particular point, the pressure on expandable vessel 16 may be sufficient to rupture expandable vessel 16, either at a seam or through the elastic material itself. To prevent this, apparatus 10 further includes a pressure regulating fluid outlet 22, as shown in FIG. 2. Pressure regulating fluid outlet 22 is configured to release fluid when the pressure exerted by fluid meets a pre-set threshold, set at a point below the point at which expandable vessel 16 may be liable to rupture.

When material 12 is sufficiently shed from surface 14, then an operator of the vehicle 15 may elect to operate the vehicle 15 on roadways (or rail or other surfaces, as the case may be). Before operating the vehicle, it would be preferential to return expandable vessel 16 to a substantially flat shape, which may provide less wind resistance for the travel of the vehicle, and may return expandable vessel 16 to a conformation for later expansion and shedding of unwanted material, if further material later accumulates on surface 14.

Fluid introduced into expandable vessel 16 remains under pressure within expandable vessel 16. This pressure exceeds atmospheric pressure, such that fluid may be released by opening an outlet valve or other port to allow the egress of fluid to the surrounding environment. Such an outlet valve or other port may be the pressure regulating fluid outlet 22, may be the fluid inlet 20 when opened to the environment, or may be a separate outlet. When the fluid inside expandable vessel 16 is opened to the environment, the pressure will naturally seek to escape from expandable vessel 16 to the external environment. This pressure may only be sufficient to substantially, but not entirely deflate expandable vessel 16. However, where expandable vessel 16 is originally fixed to surface 14 under tension, expandable vessel 16 will naturally return to the conformation which is substantially flat along surface 14, due to pressure differentials and the tension imparted on expandable vessel 16 when attached to vehicle in a stretched manner.

As illustrated in FIGS. 1-3, a shape of the expandable vessel 16 matches or approximately matches the shape of the surface 14 (e.g., roof) of the trailer of tractor trailer 15 or other vehicle, for example rectangular. As illustrated in FIGS. 1-3, dimensions (e.g., length, width) of the expandable vessel 16 match or approximately match (e.g., within 3 inches, 2 inches, 1 inch) the corresponding dimensions (e.g., length, width) of the surface 14 (e.g., roof) of the trailer of tractor trailer 15 or other vehicle.

In addition to means for fixing apparatus 10 to surface 14, apparatus 10 may be further fixed along the leading edge of travel of the vehicle 15 to prevent air from flowing between surface 14 and expandable vessel 16, in order to maintain optimal aerodynamic performance and to ensure forces are minimized that may seek to cause apparatus to be pulled from surface 14.

The pressure regulating aspects of pressure regulating outlet 22 may be mechanical, electromechanical, and may also have firmware or software control. The threshold at pressure regulating outlet 22 is activated may be set by considering the elasticity of expandable vessel 16, the size and shape of expandable vessel 16, the method of manufacture of expandable vessel 16, and whether there may be any seams that may be vulnerable to separation, and the particular application and climate or other environmental concerns. Such factors may be set by a person of ordinary skill in the art.

Elastic material for expandable vessel 16 may be selected by a person of ordinary skill in the art, and the method of sealing seams of expandable vessel may also be selected by a person of ordinary skill in the art. For example, expandable vessel 16 may substantially manufactured by folding a sheet of elastic material and sealing three sides, or may be manufactured from two sheets of the same, of different, materials and sealing expandable vessel 16 on three sides. Further, expandable vessel 16 may be extruded as a tube and sealed into a vessel, or may be cast in shape.

Fluid inlet 20 may be selected for the particular application and the nature of the fluid to be introduced into expandable vessel 16. In an application for a tractor-trailer, as shown in FIG. 1, fluid inlet 20 may be selected as a gladhand type connector to enable use of the tractor-trailer's air compressor as a fluid source. Fluid inlet 20 may further include a hose leading from expandable vessel 16 with a gladhand connector at the distal end of the hose, to allow for easy connection to the tractor-trailer's air compressor or canister of compressed air. Further, the gladhand may preferably be color coded red to indicate attachment to the tractor-trailer air compressor supply line. Any source of compressed air or other fluid may be utilized, provided it can be introduced via the fluid inlet 20 and expelled via the pressure regulating outlet 22.

Tension on expandable vessel 16, once fixed, should be selected such that the tension is of sufficient magnitude to return expandable vessel 16 to a substantially flat shape upon the egress of the contained fluid.

Attachment means 18 may be selected by a person of ordinary skill in the art for a particular application. A series of flat hooks and eyelets may be employed however, any means known in the art of fixing or adhering expandable vessel 16 to the surface 14, or to align expandable vessel 16 along the plane of the surface 14, under tension, may be used. For example, eyelets may be punched and grommetted through a flange of seamed material or may be loops of metal, rope, or other material extending beyond the flange of seamed material. In FIG. 2, a series of eyelets are punched and grommetted through a flange of seamed material where the flange of seamed material is located peripherally. Further, attachment means 18 may be formed from a zippered in central section zippering into a permanent zippered flange on the surface of the vehicle, may be attached via hook and loop fasteners such as Velcro® brand hook and loop fasteners, by magnetic means, or other mechanical means, such as screws or snaps, or other means known in the art.

In an example, the elastic material of expandable vessel 16 is made up of two sheets of ethylene propylene diene monomer ("EPDM"), commercially available as a roofing product, from Bridgestone Americas Tire Operations, LLC. The sheets of EPDM are bonded at the perimeter, in this example through vulcanization however other means of bonding may be employed such as by a lap adhesive or seam adhesive known in the art. A commercially available valve spud may form the fluid inlet 20, which may be bonded into the surface of the sheet of EPDM. In this example, valve spud is fixed to an air line hose with a gladhand connector to engage the air compressor of the vehicle. Where fluid inlet 20 receives air from the air brake lines of a vehicle, a further safety enhancement is derived as the air brakes of the vehicle will remain engaged when not pressurized, preventing unexpected movement of the vehicle. In this example, the pressure regulating fluid outlet 22 is a check valve commercially available from Generant Valves, 1865 Route 23 South, Butler, N.J., USA. In this example, the pressure regulating fluid outlet 22 is fixed to a hose extending from a valve spud incorporated into the expanding vessel 16. In this example, the expandable vessel 16 is fixed to the surface 14 with flat hooks and eyelets, as shown in FIG. 2. In this example, the EPDM material is sized so that expandable vessel covers 90% of the intended surface in the relaxed state, such that when installed, expandable vessel 16 is stretched beyond 100% of its relaxed area, creating the tension described above. Differing tensions, or installation without tension may also be employed. The molecular memory of the EPDM, coupled with the tension applied, or without, as the case may be, causes the expandable vessel 16 to force air out to the surrounding atmosphere when the pressure regulating outlet 22, or other outlet, is opened. As apparatus 10 is fixed to surface 14 through hooks 18A and eyelets 18B, it can be removed when operating the vehicle in an environment when material accumulation is not a concern.

Figure 4:
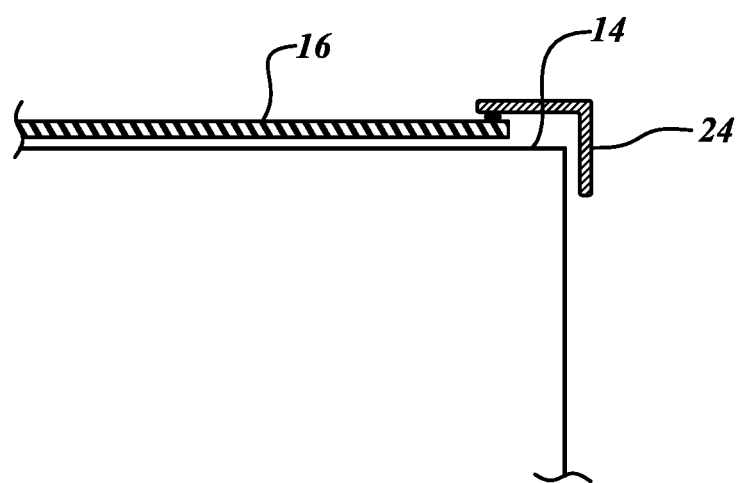
FIG. 4 is a cross section view of a portion of an apparatus showing a flange adapted to prevent the flow of air between the expandable vessel and the surface.

Tension applied to the EPDM sheet forming expandable vessel 16 upon installation will help reduce the potential for air to flow between expandable vessel 16 and the surface 14. The potential for air to flow between expandable vessel 16 and the surface 14 is most acute at the leading edge of expandable vessel 16. To help reduce the potential for air to flow between expandable vessel 16, a flange 24 may be fitted across the leading edge of expandable vessel 16, as depicted in FIG. 4. Flange 24 may be bolted to the expandable vessel 16 and then adapted to fit within or engage with the surface 14. In an example, flange 24 may be an L-shaped or J-shaped bar that engages or passes over the corner cap of a semi-trailer. FIG. 4 is a cross section view of a portion of an apparatus showing a flange adapted to prevent the flow of air between the expandable vessel and the surface. FIG. 4 shows flange 24 engaged to expandable vessel 16 and fitted to surface 14.

In another example, one or more inlet or outlet may include a Halkey Roberts inflator valve or a High Flow PVR valve (pressure relief valve) with a 3.0 to 3.5 PSI cracking point, such as valve part number TV10065. Such valves are two part housings, which when coupled or screwed together, sandwich the membrane between the two housing parts forming a seal. An additional ring of membrane may be added as a "doubler" for additional strength around the seal. Inserted into the inflator valve may be a standard H/R inflator insert which may be connected to a hose with, at the opposite end, fitted to a glad hand type connector.

The various embodiments described above can be combined to provide further embodiments. Canadian patent application no. 2,886,411, filed Mar. 23, 2015 is incorporated herein by reference, in its entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for shedding material accumulated above a surface, the apparatus comprising an expandable vessel comprised of an elastic material, a fluid inlet, a pressure regulating fluid outlet, the expandable vessel is adapted to receive a fluid via the fluid inlet and contain the fluid such that upon the fluid being introduced into the expandable vessel, via the fluid inlet, pressure will be exerted on the elastic material such that the expandable vessel expands from a substantially flat shape to a domed shape such that the material accumulated above the surface is shed from the surface under the influence of gravity, the pressure regulating fluid outlet adapted to regulate the pressure the fluid exerts on the elastic material to a maximum pressure, wherein the expandable vessel is stretched and fixed to the surface under tension such that the expandable vessel lies in the substantially flat shape on the surface.

2. The apparatus of claim 1 wherein the elastic expandable vessel is comprised of a synthetic rubber.

3. The apparatus of claim 2 wherein the synthetic rubber is comprised of an m-class rubber.

4. The apparatus of claim 3 wherein the m-class rubber is comprised of an ethylene propylene diene monomer.

5. The apparatus of claim 3 wherein the elastic material stretches up to 125 percent of its upstretched width.

6. The apparatus of claim 1 wherein the fluid is air from a vehicle brake system.

7. The apparatus of claim 1 wherein the expandable vessel has a volume, and wherein the expandable vessel is comprised of sheets of synthetic rubber having edges, wherein the sheets are bonded in the region of the edges so as to enclose the volume.

8. The apparatus of claim 1 wherein the fluid inlet is adapted to allow ingress and egress of the fluid.

9. The apparatus of claim 1 wherein under egress of the fluid, the expandable vessel deflates from the dome shape to the substantially flat shape under tension of the stretched elastic material.

10. The apparatus of claim 1 further comprising a flange adapted to prevent flow of air between the expandable vessel and the surface.

11. The apparatus of claim 1 wherein the fluid inlet is adapted to engage with air lines of a vehicle.

12. The apparatus of claim 1 wherein the expandable vessel has a shape that matches a shape of the surface.

13. The apparatus of claim 12 wherein the expandable vessel has at least one dimension that at least approximately matches a corresponding dimension of the surface.

14. A vehicle having a roof and an expandable vessel for shedding material accumulated on the roof, the expandable vessel comprising an elastic material, stretched and attached to the roof under tension such that the expandable vessel lies in a substantially flat shape on the roof, the expandable vessel adapted to contain a fluid and comprises a fluid port and a pressure regulating fluid outlet wherein upon the fluid being introduced into the expandable vessel via the fluid port, under pressure, the expandable vessel expands from the substantially flat shape to a domed shape wherein material accumulated on the roof is shed from the roof under the influence of gravity, and wherein the pressure regulating fluid outlet regulates the pressure of the fluid inside the expandable vessel to a maximum pressure, wherein the expandable vessel has a shape that matches a shape of the roof.

15. The vehicle of claim 14 wherein the expandable vessel has at least one dimension that at least approximately matches a corresponding dimension of the roof.

16. A trailer having a roof and an expandable vessel for shedding material accumulated on the roof, the expandable vessel comprising an elastic material, stretched and attached to the roof under tension such that the expandable vessel lies in a substantially flat shape on the roof, the expandable vessel adapted to contain a fluid and comprises a fluid port and a pressure regulating fluid outlet wherein upon the fluid being introduced into the expandable vessel via the fluid port, under pressure, the expandable vessel expands from the substantially flat shape to a domed shape wherein material accumulated on the roof is shed from the roof under the influence of gravity, and wherein the pressure regulating fluid outlet regulates the pressure of the fluid inside the expandable vessel to a maximum pressure, wherein the expandable vessel has a shape that matches a shape of the roof.

17. The trailer of claim 16 wherein the expandable vessel has at least one dimension that at least approximately matches a corresponding dimension of the roof.

* * * * *